June 13, 1950　　　　C. A. ANDERSON　　　　2,511,233
DETECTION DEVICE
Filed Dec. 8, 1945　　　　　　　　　　2 Sheets-Sheet 1
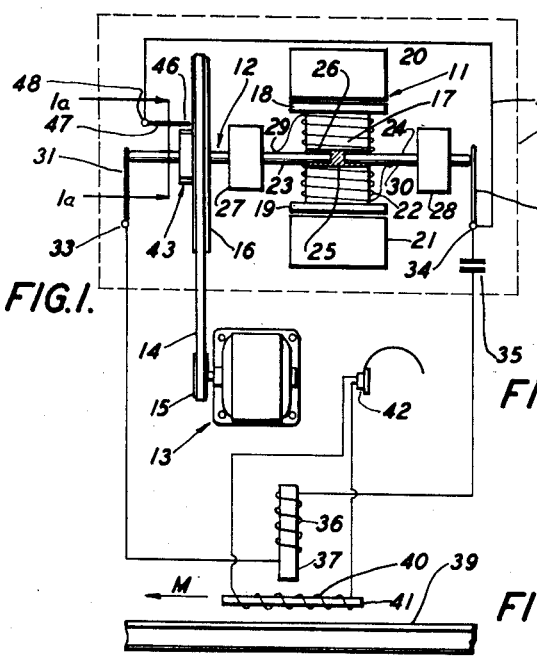
FIG.1.
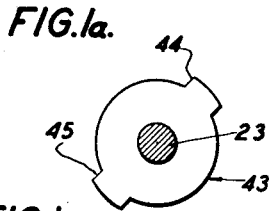
FIG.1a.
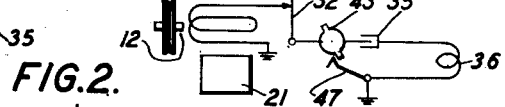
FIG.1b.
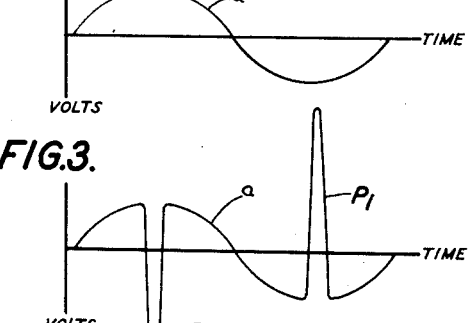
FIG.2.
FIG.3.
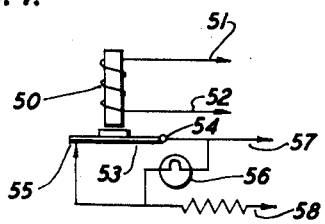
FIG.4.
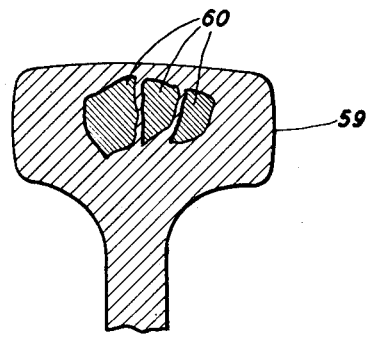
FIG.5.
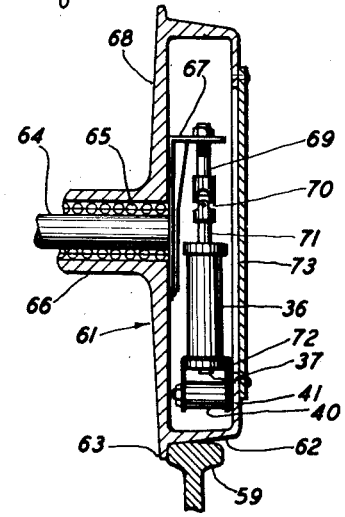
FIG.6.
INVENTOR.
CLARENCE A. ANDERSON
BY Christie & Angus
ATTORNEYS June 13, 1950  C. A. ANDERSON  2,511,233
DETECTION DEVICE
Filed Dec. 8, 1945  2 Sheets-Sheet 2
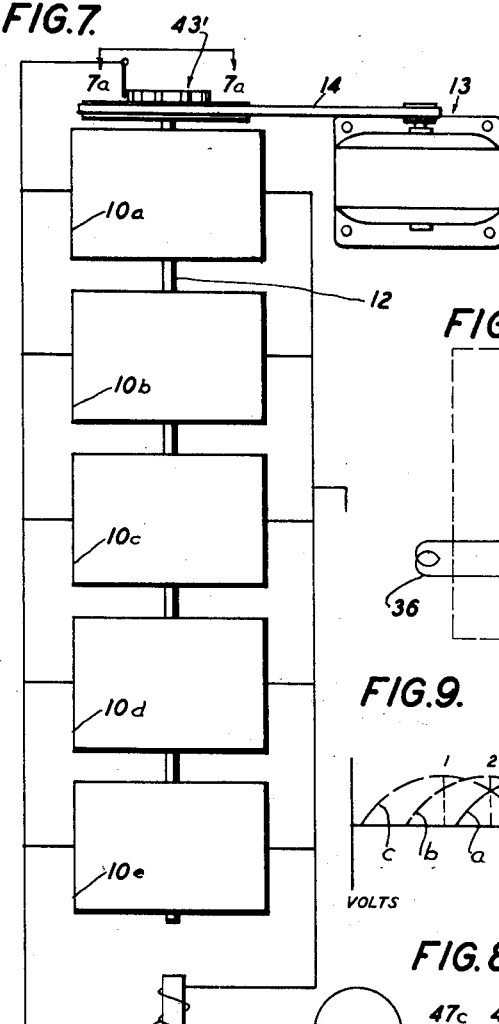
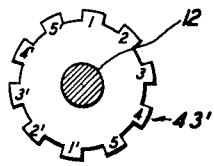
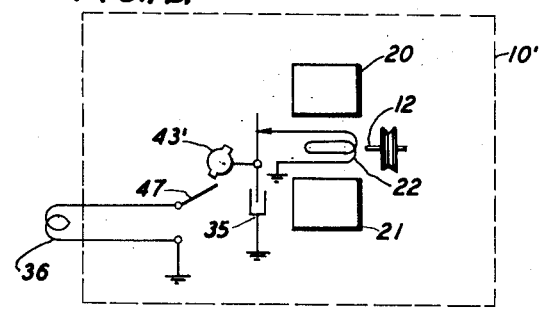
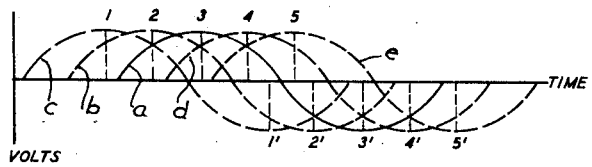
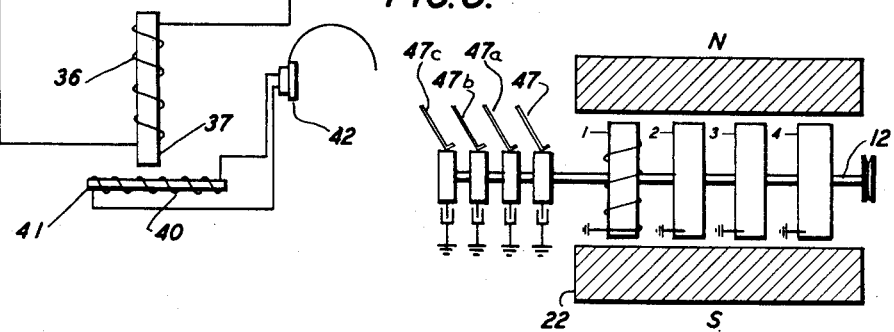
INVENTOR.
CLARENCE A. ANDERSON
BY Christie & Angus
ATTORNEYS Patented June 13, 1950

2,511,233

UNITED STATES PATENT OFFICE 2,511,233

DETECTION DEVICE

Clarence A. Anderson, San Diego, Calif.

Application December 8, 1945, Serial No. 633,791

3 Claims. (Cl. 175—183)

This invention relates to flaw detection and particularly to the detection of flaws in structures such as rails or bars or other objects of magnetic material.

The principal object of the invention is to provide a simple but efficient way of detecting flaws in such structures.

It is well known that steel members sometimes contain imperfections which when present detract from the strength of the steel member and sometimes produce failures. This is particularly true in the case of steel railroad rails which sometimes have or develop fissures. The fissures may not always be present in the rail when it is first laid in the track, but they may develop and enlarge gradually under the pounding impact of railroad trains. In consequence it is of great importance to be able to test the rails at fairly frequent intervals.

Rail flaw detecting devices have heretofore been in common use. Such detectors, however, have heretofore had undesirable features. One practice, for example, has been to send a very high electrical current through a section of a rail between a pair of contacts applied to the rail. This has required the use of large and expensive equipment for generating the heavy current and detecting the changes of electrical resistance in the rail which might be occasioned by transverse fissures. It has been the practice to put this equipment on a car which would then be propelled or pulled along the rails, and, owing to the great weight and size of the equipment, a car of substantial size is required.

According to my present invention, I overcome the foregoing disadvantages of the high current equipment by the use of a relatively small and simple electrical generator such as a magneto. I provide a condenser charged from the generator and provide means for periodically discharging the condenser through a coil adapted to project magnetic pulses into the member under test. I further provide in proximity to the tested member a detecting or pickup coil, so arranged with reference to the tested member and the pulse projecting coil that little or no resulting voltage is induced in the pickup coil when the rail or structure under test is free from flaws. When a flaw or fissure is present, however, it distorts the magnetic field created by the pulse projecting coil sufficiently to produce an unbalance which induces a resultant voltage in the pickup coil which can be detected by a suitable device such as a galvanometer or telephone receiver or the like.

A feature of my invention resides in a unique means for producing pulses of high intensity and short duration in rapid succession, from a relatively low intensity generator output.

A related feature resides in an arrangement whereby the frequency and relative intermittency of the pulses can be regulated as desired.

The foregoing and other features and advantages of my invention will be better understood from the following detailed description and drawings of which:

Fig. 1 shows a flaw detecting system according to my invention;

Fig. 1a shows a cam detail used in the system of Fig. 1;

Fig. 1b is a schematic wiring diagram of the system shown in Fig. 1;

Fig. 2 shows a voltage wave produced in the operation of the system of Fig. 1;

Fig. 3 shows a voltage wave with pulses produced in the operation of the system of Fig. 1;

Fig. 4 shows an indicating arrangement which may be used alternatively to that shown in Fig. 1;

Fig. 5 shows a cross-section of a rail containing fissures;

Fig. 6 shows an arrangement of a flaw detecting system according to my invention mounted within a wheel adapted to roll on a railroad track;

Fig. 7 shows a modification of the system of Fig. 1;

Fig. 7a shows a detail of a cam used in the system of Fig. 7;

Fig. 7b is a schematic wiring diagram of a unit shown in Fig. 7;

Fig. 8 is a schematic wiring diagram showing a modification of the arrangement of Fig. 7.

Fig. 9 shows voltage waves produced in the operation of the system of Fig. 7.

Referring to Fig. 1, the system comprises a pulse-generating mechanism located within the dotted rectangle 10. This comprises an alternating current generator or magneto 11 mounted on a shaft 12 and driven from an electric motor 13 by means of a belt 14 placed on the motor pulley 15 and a pulley 16 on shaft 12. The magneto 11 may be of any suitable type such as the arrangement shown in which an armature 17 is symmetrically placed on the shaft and has a pair of pole pieces 18 and 19 adapted to rotate between fixed poles 20 and 21. The armature has wound on it a coil 22, in which the usual alternating voltage is generated according to the voltage wave shown in Fig. 3.

For convenience, the shaft 12 may be formed in two parts 23 and 24 as shown, and these two parts are separated from each other at 25 within an insulating tubing 26 into which they are fastened. The shaft 12 rotates within bearings 27 and 28. One end of the coil 22 is connected at 29 to shaft portion 23, and the other end of coil 22 is connected at 30 to shaft portion 24. To take the voltage from the ends of the shaft there are provided contact members 31 and 32 which may be in the form of leaf springs fastened at respective terminal posts 33 and 34 and pressing against the respective ends of the shaft.

The output from the magneto, at terminals 33 and 34 is closed through a series circuit comprising a condenser 35 and a coil 36 placed around a magnetic core 37. In use, the coil 36 and core 37 are placed in proximity and directed toward the test piece 39, which in the illustration is shown as a rail of a railroad track. The arrangement is such that the magnetic field from the core passes through the rail.

There is placed near the rail a pickup coil 40 wound on a core 41; and the terminals of the pickup coil are connected to a suitable device for indicating the presence of a resultant voltage in the pickup coil. In Fig. 1 this indicating device is shown as a telephone receiver 42. The pickup coil and its core 41 are placed in a symmetrical relation with the pulse coil 36 and the test piece 39, so that when the test piece is uniform, there is a zero resultant voltage across pickup coil 40 and consequently no response in the indicating device 42. In Fig. 1, this symmetry is accomplished by making the cores 37 and 41 of straight magnetic rods and placing core 41 parallel with the rail and perpendicular to core 37 such that core 41 crosses the axis of core 37 as a symmetrical T.

A suitable generator or magneto for my purpose may for example, be one adapted to run so that the frequency of its output wave may be around 25 cycles per second, although a greater or lesser frequency might be employed. The output voltage is not critical and may conveniently be around 10 or 20 volts. The condenser 35 should have a high enough capacity to accumulate a substantial charge, for example, around 4 mf.

The ordinary output voltage wave from the alternator or magneto 11, shown in Fig. 2, is not of sufficient intensity to produce enough flux in the test member 39, unless the magneto be made so large as to be excessively cumbersome. I provide means however, for producing from the ordinary output wave, a series of short high-intensity pulses which do produce sufficient flux to enter the test piece and produce a perceptible unbalance in coil 40 when a flaw is encountered. This means comprises an intermittently operating short-circuiting arrangement for intermittently short-circuiting the output of the magneto so as to cause the condenser 35 intermittently to discharge through the pulsing coil 36. The timing of the intermittent short-circuit is preferably set so that the pulses occur at the peaks of the output wave shown in Fig. 2. The arrangement which I have employed for this purpose comprises a cam 43 shown in detail in Fig. 1a, which is a view taken at line 1a—1a of Fig. 1. The cam is shown fastened to the end 23 of shaft 12, although it would not matter to which end of the shaft it is fastened. The cam has a pair of camming members 44 and 45, which are adapted to make contact with a contact member 46 held on a supporting member 47 which may be of spring-like material, the support 47 being fastened at a suitable post 48. Post 34 is connected by conductor 49 to post 48 so that every time a cam element 44 or 45 strikes the contacting member 46, the output of the magneto is short-circuited. This short-circuiting causes condenser 35 to discharge through coil 36 and the short-circuit 49.

Fig. 1b is a schematic wiring diagram of the system shown in Fig. 1. In Fig. 1b, the numbered parts correspond to the same numbered parts in Fig. 1.

I prefer to place the cam members 44 and 45 in such an angular position with reference to the pulse of the magneto that each periodic short circuit at the cam 43 will occur at a peak of the wave in Fig. 2, as in this way, the maximum discharge effect will be had from the condenser. Fig. 3 illustrates graphically the production of the pulses, in which the discharge pulses $p$ and $p_1$ are shown superposed on the output wave $a$. The timing is such that pulse $p$ is in the form of a short duration and sharply negative voltage extending from approximately the maximum positive potential of wave $a$ and the next pulse $p_1$ is a sharp positive pulse of short duration extending in the positive direction from the most negative position of wave $a$.

Owing to the short duration of the series of pulses $p$ and $p_1$, they involve very little power because of their short time duration. They do, however, represent very high-intensity instantaneous voltages which produce corresponding sharp flux pulses through the test piece.

To adjust the equipment for operation, suitable adjustment should be made so that normally no sound is heard in the telephone receiver 42 or other indicating device. This may be done in any suitable manner, for example, by relatively adjusting the coils 36 and 40 until no sound is heard in the receiver. Another way of making the adjustment is to make core 41 movable so that it may be moved endwise until no note is heard in the receiver. Another expedient would be to place a metal slide, for example, of cast iron and aluminum, over the top of the detector coil 40 so that the slide could be moved endwise to create the zero. In all of these cases the effect is as though the coils were moved with respect to each other until the current induced in the pickup coil is at a minimum.

When ever there is an unbalanced magnetic field, causing a replica of the pulses to flow in coil 36 and in the telephone receiver 42, the pulses will be heard in the receiver as a sustained note of fundamental pitch depending on the qualities of the pulses such as their periodicity and steepness.

In cases where it is somewhat difficult to get an absolute zero adjustment, operation may still be had by making use of the minimum value of voltage across the pickup coil instead of absolute zero. This may be done, for example, where the output of the pickup coil is fed into an amplifier, the output of which may have some indicating device. If a meter be placed in the output of the amplifier, the minimum deflection of the meter can be used to indicate the flaws, regardless of whether there is absolute zero voltage across the pickup coil. In this way, an operator may visually observe the meter reading instead of or in addition to listening to them in a telephone receiver.

It will be recognized that it will not always be essential to use a telephone receiver or the like for detection, as other detecting arrangements might be used instead, or in addition. Fig. 4, for example, shows a relay coil 50 having terminals 51 and 52 adapted to be connected across coil 40 in place of, or in addition to the telephone receiver 42. Coil 50 is provided with a vibratory armature 53, pivoted at 54 so that the armature will tend to be attracted to coil 50 or its core whenever a resultant voltage appears across pickup coil 40. This will tend to break the armature contact at 55 so that some indicating device such as a lamp 56 operated from a voltage source across terminals 57 and 58 will go out. It would not even be necessary for the attraction of the coil 50 to be sufficient to produce actual opening of contact 55; it would be sufficient, for example, if the contact at 55 merely became lighter, that is, of greater resistance. This would tend to produce corresponding changes in the intensity of lamp 56 which would be sufficient to indicate the presence of a flaw in the test member 39.

The relay coil 50 might, of course, be made self-locking, if desired, by means of a well-known form of stick circuit, so that once the relay coil is actuated, it would remain actuated and thus be brought to the attention of the operator.

The most common serious kind of flaws in railroad rails are transverse fissures which, when they grow large enough, produce rail failures. In Fig. 5, there is shown in cross-section, the upper part of a rail 59 containing a number of transverse fissures 60. The flux from the pulsing coil 36 passes through the head of rail 59 and in part through these fissures. As the permeability of a fissure is different from that of the rail itself, the presence of the fissures will alter or distort the magnetic field so that when the members 37 and 41 move in one direction or the other along the rail, for example, in the direction M in Fig. 1, the fissures will first lie under the leading end of core 41 and then under the lagging end of core 41. During this time that core 41 is passing over the fissures, the distortion of the field, part of which is passing through core 41, will produce a resulting voltage in coil 40, which will be evidenced by the note in the telephone receiver or the indication of such other indicator as may be used. If desired, suitable electrical recording equipment may be employed in a well known manner to make a record of the pulses and their location on the track.

When my flaw detecting system is used on a railroad track, it will be convenient to place the equipment on a suitable vehicle such as a small car or truck which may roll or be propelled along the track. The magneto and the detecting or recording equipment may be placed on the platform of the truck and the pulsing and pickup coils should be placed in proximity to the rail. A suitable arrangement of the pulsing and pickup coils is shown in Fig. 6.

There is shown a car wheel 61 having the usual rim 62 and flange 63 riding on the railhead 59. The wheel is arranged to rotate on a stationary axle 64 of the car, and for this purpose there are shown suitable bearings such as ball bearings 65, between the wheel hub 66 and the axle. The pulsing and pickup coils are mounted on the outer end of the axle, within the circular rim of the wheel, so that the coils do not rotate with the wheel but can be maintained in a fixed position with reference to the rail. For this purpose, there is provided angular bracket 67 fastened to the end of the axle and spaced from web 68 of the wheel. A bolt 69 supported from the bracket is provided at its lower end with a universal joint 70, which carries a bolt or rod 71 arranged to support the pulsing coil 36 having the lower end of its core 37 directed downward toward the rail. The lower end of coil 36 is provided with a bracket arrangement 72 on which is mounted the pickup coil 40. In the position shown, the pickup coil 40 has its core 41 perpendicular and intersecting the axis of core 37 so as to form a symmetrical T arrangement of the cores as described heretofore in connection with Fig. 1. Core 41 however, is not shown parallel to the longitudinal axis of the rail as it is in Fig. 1 but instead is shown perpendicular to the longitudinal axis of the rail. This may sometimes be a desirable position as it may tend to detect rail fissures running in a direction which would not be so easily detected if the core 41 were parallel to the longitudinal axis of the rail. The bracket 72, however, should preferably be arranged so that its angular position can be adjusted to turn the core 41 to any angle desired, for example, in the direction shown in Fig. 1.

The universal joint 70 is useful in providing some degree of adjustment for the direction of the core 37. It may be found that greater sensitivity and efficiency can be had if some obliqueness is provided between the direction of core 41 and the rail head.

To keep the dust and dirt out of the apparatus, a cover plate 73 is provided over the outer face of the wheel.

Further efficiency and ease of detection may be made possible with the apparatus according to my invention, by creating more pulses in a given period of time than would be produced by the apparatus of Fig. 1. This might be done, for example, by increasing the number of pulses of the magneto above the simple two-pole construction shown in Fig. 1, and by increasing the number of camming elements 44 and 45 correspondingly.

Another way of increasing the pulsing frequency or intensity is the arrangement shown in Fig. 7. In Fig. 7 there are shown several of the pulse generating devices of the general type shown within the dotted rectangle 10 of Fig. 1, these being indicated by the rectangles 10a, 10b, 10c, 10d, and 10e in Fig. 7. It will be preferable, however, to modify the connection of the condenser within the unit somewhat, from the arrangement used in Fig. 1. Instead of using the schematic arrangement shown in Fig. 1b, it is preferable to use the schematic arrangement shown in Fig. 7b, wherein the elements within the dotted rectangle 10' represent the elements within the rectangles 10a to 10b. In Fig. 7b, the unit is shown with the condenser 35 connected across the generator winding 22. The pulsing coil 36 is connected across condenser 35 but in series with the cam contact 47. Thus, the condenser 35 is periodically connected across pulsing coil 36 by action of contact 47. The particular circuit arrangement has the advantage that when a number of the units within the rectangle 10' are used, all of the condensers 35 of the several units may have one of their sides connected together and the other side connected to a set of the camming contacts.

Fig. 8 shows an alternative arrangement which may be used in lieu of the arrangement of Fig. 7, if it is desired to use one set of generator poles instead of a separate set of poles for each unit. In Fig. 8, the one set of poles is indicated by the pole letters N and S, representing the north and south poles of the generator. One side of each armature winding is connected to a common terminal represented by ground in Fig. 8, and the other side of each terminal is conected to a cam. The respective terminals connected to the cams are 1, 2, 3, 4, etc., and the cams are correspondingly numbered. Thus, winding 22 for the first unit is shown connected between ground and cam 1; and the second winding is shown with its lower terminal connected to ground and its upper terminal 2 will be connected to cam 2. Cam 1 is adapted to make contact with contact arm 47; cam 2 is adapted to make contact with a similar contact arm 47a; cam 3 is adapted to make contact with another contact arm 47b; and cam 4 is similarly adapted to make contact with contact arm 47c. Each unit has its own condenser, and these condensers are shown in schematic relation with the respective cams.

The advantage of the arrangements of Figs. 7 and 8 is that the phase relations of the several units may be adjusted as may be desired. If it should be found that for certain applications it is advantageous to increase the pulsing frequency, the relative angularities of the several armatures on the shaft 10 may be spaced uniformly as represented by the output waves of Fig. 9. In Fig. 9, the solid curve $a$ represents the curve $a$ of Fig. 2, and is the normal output wave of one of the magnetos, for example, that in unit 10a. The magneto in 10b may then be phase displaced with reference to that in 10a so that its output wave is according to the dotted curve $b$. Curves $c$, $d$, and $e$ represent phase-displaced waves of the magnetos 10c, 10d and 10e.

The condenser 35 in each of the five units may be discharged at the maximum instantaneous intensities of the corresponding voltage wave. Thus the condensers are shown discharging at the positive half-cycles at the positions 1, 2, 3, 4, 5 and on the negative half-cycles at the positions 1', 2', 3', 4' and 5', respectively. In this way, there are produced ten pulses per cycle of each magneto instead of the two pulses shown in Fig. 3.

A suitable cam for producing the pulses represented in Fig. 8, is shown in Fig. 7a which is a view taken at line 7a—7a in Fig. 7. The cam 43' has ten camming pieces marked 1, 2, 3, 4, 5, and 1', 2', 3', 4' and 5' respectively, and these are angularly displaced from each other in correspondence with the angular phase displacement in Fig. 9. To effectuate such a cam arrangement, a separate conductor should be led from the corresponding end of each magneto coil to the corresponding cam elements. Such conductors should be in lieu of the connection 29 to the shaft, shown in Fig. 1.

It may not always be necessary or desirable to space the pulses as shown in Fig. 9. Any suitable spacing may be provided as desired. For example, it might be desired to increase the intensity of the pulses over a shorter period; and this could be done, for example, by placing all of the units in Fig. 7 at the same phase or possibly nearly at the same phase so that there would be a tendency to build up the flux intensity in the test piece.

My invention is not limited to the precise embodiments illustrated, which are shown and described merely for the purpose of illustration; and other modifications for specific applications will suggest themselves. For example, my invention is not limited to the particular form of magneto or generator shown. Instead of the constructions shown, the generating device may consist of a permanent magnet type of armature such as a bar magnet arranged to rotate on the shaft between stationary coils in which the output voltage wil be generated; or if desired, some other form of magneto arrangement might be employed, such as a magnet adapted to vibrate in relation to a coil. If desired, a pulsating or uni-directional generator might be used to furnish uni-directional pulses for charging the condenser. In fact, any electrical power or generating system which would charge the condenser, combined with the timing cam or element for discharging the pulses would perform the function.

Again, I may vary the arrangement of multiple units shown in Fig. 7. For example, it may be desirable to place the units 10a to 10e of Fig. 7 in series to increase the overall output voltage, instead of in parellel with each other as shown in Fig. 8.

It will be recognized that by my invention, I have provided a relatively simple, inexpensive and lightweight arrangement for producing indications of magnetic field irregularities, without the necessity for using heavy currents or voltages or high power equipment. By reason of its simplicity, it is not necessary to provide an elaborate car or train to be routed over a railroad track; but instead a simple lightweight and small truck, such as a hand-car or the like may be used to carry the equipment over the track. This could be easily placed on and off the rails as desired to allow train movements to proceed without regard to the testing equipment.

I claim:

1. In apparatus for detecting flaws in an elongated metallic member, the combination which comprises an energizing coil disposable with its axis transverse to that of the member to be tested and in inductive relationship therewith, a magnetizable core in the coil, means for passing a series of sharp alternating rhythmic bursts of energy through the energizing coil, a pickup coil disposed in inductive relationship to the energizing coil and to the member with its axis transverse to the axis of the energizing coil, a magnetizable core in the pickup coil, a current indicating device connected in series with the pickup coil, and means for relatively adjusting the two coils to reduce current induced in the pickup coil by the field created by the energizing coil to a minimum.

2. In apparatus for detecting flaws in an elongated metallic member, the combination which comprises an energizing coil disposable with its axis transverse to that of the member to be tested and in inductive relationship therewith, a magnetizable core in the coil, means for passing a series of sharp alternating rhythmic bursts of energy through the energizing coil, a pickup coil disposed in inductive relationship to the energizing coil and to the member with its axis transverse to the axis of the energizing coil, a magnetizable core in the pickup coil, a current indicating device connected in series with the pickup coil, and means for relatively adjusting the two coils to reduce current induced in the pickup coil by the field created by the energizing coil to a minimum by shifting the core in the pickup coil endwise of the coil.

3. In apparatus for detecting flaws in an elongated metallic member, the combination which comprises an energizing coil disposable with its axis transverse to that of the member to be tested and in inductive relationship therewith, a magnetizable core in the coil, means for passing a series of sharp alternating rhythmic bursts of energy through the energizing coil, a pickup coil disposed in inductive relationship to the energizing coil and to the member with its axis transverse to the axis of the energizing coil, a magnetizable core in the pickup coil, a current indicating device connected in series with the pickup coil, and means for effectively moving the coils with respect to each other to reduce current induced in the pickup coil by the field created by the energizing coil to a minimum.

CLARENCE A. ANDERSON.

REFERENCES CITED

The following references are of record in the file of this patent:

UNITED STATES PATENTS

| Number | Name | Date |
| --- | --- | --- |
| Re. 15,859 | Burrows | June 17, 1924 |
| 1,628,767 | Brown | May 17, 1927 |
| 2,065,118 | Davis | Dec. 22, 1936 |
| 2,130,882 | Frobose | Sept. 20, 1938 |
| 2,136,375 | De Forest | Nov. 15, 1938 |
| 2,185,589 | Drake et al. | Jan. 2, 1940 |
| 2,228,293 | Wurzbach | Jan. 14, 1941 |
| 2,357,666 | Kuehni | Sept. 4, 1944 |
| 2,425,857 | Barnes et al. | Aug. 19, 1947 |

FOREIGN PATENTS

| Number | Country | Date |
| --- | --- | --- |
| 492,501 | Great Britain | Sept. 21, 1938 |